United States Patent Office 3,366,356
Patented Jan. 30, 1968

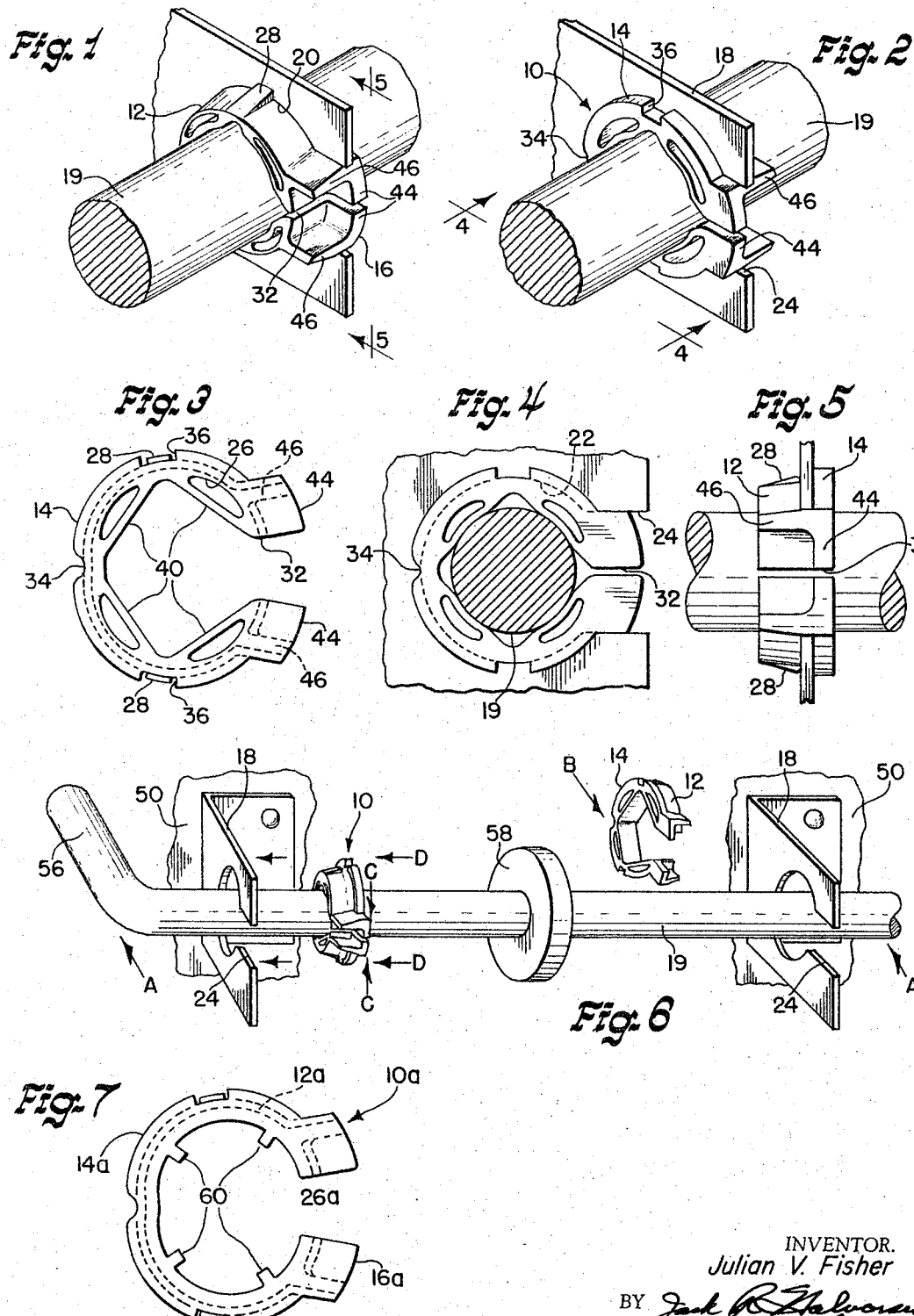

3,366,356
BUSHING AND COMBINATION OF BUSHING
AND SUPPORT PLATE
Julian V. Fisher, Carpentersville, Ill., assignor to Illinois
Tool Works, Inc., Chicago, Ill., a corporation of
Delaware
Filed Apr. 29, 1966, Ser. No. 546,228
6 Claims. (Cl. 248—56)

ABSTRACT OF THE DISCLOSURE

The invention relates to a one-piece plastic bushing for use in an apertured support plate to position a rod-like member in perpendicular relation to the support plate. The bushing is provided with a plurality of strap-like members fastened at their ends in circumferentially spaced chordal relation within a through bore in the bushing. The strap-like members are adapted to be radially deformed to conform to the external configuration of the rod-like member for rotation of the rod within the support plate.

This invention relates to a one-piece bushing for supporting a rod-like member in substantially perpendicular relationship to an apertured support.

In the art of control rods and the use of means for supporting them, it often is difficult to assemble the rods with apertured supports, due to the presence of bends in a rod or the presence of additional means mounted on the rod, both of which prevent the axial insertion of a rod within the work support.

It is an object of the present invention to provide means for mounting a rod-like member in perpendicular relationship to a work support wherein the rod is moved in a direction perpendicular to its axis through a slot communicating with the edge of a work support. A bushing is positioned intermediate the rod and the work support, said bushing including a through bore having a plurality of strap-like elements attached at opposite ends to the interior of the bore and circumferentially spaced in chordal relation to the bore. Strap-like members being adapted to be radially deformed intermediate their ends to conform to the configuration of the rod and to support and maintain the rod in assembled relation to the work support.

Another object of the invention is to provide a one-piece, thermo-plastic, non-rotatable bushing capable of supporting a rod in perpendicular relation to a workpiece.

A further object of the invention is to provide a plurality of bushings mounted in an equal number of spaced apertured work supports which are capable of compensating for tolerance variations in the rod and in the configuration of the apertures in the work supports; said bushing also being capable of compensating for misalignments of the work supports or their apertures relative to the axis of the rod.

Still another object of the invention is to provide a bushing which is simple in design, economical to fabricate and which facilitates the ease of assembly of a rod with a work support.

Still other objects of the invention will become apparent when the specification is read in conjunction with the accompanying drawings wherein:

FIG. 1 is a perspective view in partial section of an installation embodying the principles of this invention as viewed from the shank end of the bushing;

FIG. 2 is a perspective view in partial section of the same embodiment of this invention as viewed from the opposite or head end of the bushing;

FIG. 3 is an elevational view of a bushing embodying the principles of this invention as viewed from its head end;

FIG. 4 is an elevational view in partial section of the head end of bushing installation as viewed along line 4—4 of FIG. 2;

FIG. 5 is a side view of the bushing as viewed along lines 5—5 of FIG. 1;

FIG. 6 is an exploded perspective view of a typical installation utilizing a plurality of bushings and work supports of the type contemplated by the present invention and showing such bushings in various stages of installation; and FIG. 7 is an elevational view from the head end of a further embodiment of the present invention.

Referring now to the drawing, bushing 10 of the type contemplated by the present invention includes a shank 12, a head 14 and rotation preventing means 16. The bushing preferably is mounted in a support member 18 and adapted to support a complementary rod-like means 19. Support member 18 is preferably made of rigid sheet material and provided with a keyslot aperture 20 having a circular portion 22 spaced from the edge of member 18 and communicating with said edge by means of slot 24, for purposes best set forth hereinafter.

The shank 12 is externally tapered from adjacent its juncture with head 14 and is provided with a through bore 26 which traverses both the shank 12 and the head 14. A plurality of protuberances or shoulder means 28 are positioned on shank 12 and terminate in abrupt faces which are in opposed space relation to the undersurface of head 14. Shoulder means 28 are preferably tapered at one end in the same direction as the taper of shank 12 to facilitate insertion in the workpiece. In the present embodiment there are two such shoulder means 28 shown but the exact number is a matter of choice. Additionally, the shoulder means 28 could be of greater circumferential extent than shown, as for example, a groove in the shank adjacent to the head, as is well known in the art and hence not shown. To facilitate radial assembly of the bushing with the rod 19, the bushing 10 is provided with a split 32 which extends throughout its entire axial extent. The bushing 10 can be flexed by opening split 32 to an extent sufficient to accept the diametral measurement of rod 19, as more clearly set forth hereinafter.

Head 14 in the present embodiment is a laterally extending flange at one extremity of the shank 12 and may be discontinued at spaced circumferential points. At a point opposite the split 32 the head is relieved to provide a hinge section 34 running along the axial extent of shank 12. Further relief of the head 14 takes place at points 36 which are axially aligned with the shoulders 28. The discontinuities 36 facilitate the molding of the present device in a two-plate injection mold. Further, the discontinuities 36 contribute to the flexibility of the head section, particularly at the peripheral location of shoulders 28, and thereby facilitate assembly of the bushing within the aperture.

Internally of the bushing and extending axially within the through bore 26 are a plurality of circumferentially spaced resilient means. In the preferred embodiment the resilient means take the form of a plurality of strap-like members 40 which are integrally connected at their opposite ends to the inwardly facing surface of through bore 26. The strap-like members 40 are chordally arranged so that their opposed surfaces are at a predetermined diametral spacing, for purposes best set forth hereinafter.

Additionally, in the preferred embodiment, the bushing is provided with rotation preventing means 16 which include lateral extensions 44, in the same plane as head 14 and a pair of flange means 46 extending laterally from shank 12 with flanges 46 at their upper extremity lying in a plane substantaily parallel to the axis of the bushing. Their outer surface is tapered in the same direction as the taper of the shank 12 for purposes best set forth hereinafter.

Bushings embodying the teachings of the present invention are preferably injection molded of thermoplastic materials such as nylon.

The bushing is initially molded in an open condition as shown in FIG. 3 to facilitate the assembly of the bushing with a rod-like member 19. When the bushing is circumferentially compressed by closing split 32, an imaginery cylinder coincident with the axis of the bushing and having a diameter tangential with the chordal strap like members 40 will preferably be equal to or slightly smaller in diameter than the diameter of the rod-like member 19 with which the bushing is to be ultimately associated.

An assembly of the type contemplated by the present invention normally includes two or more support members 18 mounted in spaced relation on a common work structure 50 with the slot 24 communicating with an edge of support member 18 spaced from the work piece 50. The rod 19 is generally moved perpendicular to its axis as indicated by the arrows A through the slot portions 24 of the keyhole apertures 20 until such time as the rod 19 is positioned within the circular portion 22 of the aperture. Bushings 10 equal in number to members 18, are moved radially in the direction of the arrow B, as seen in FIG. 6. It should be noted that in normal practice the arrow B could be in any convenient direction, such as the direction shown by arrows A, but for clarity of illustration it is shown in its present position. When the bushing is mounted on the rod 19 it is compressed or flexed about its hinge point 34, as indicated by the direction of the arrows C, by suitable means such as special pliers, not shown, and then moved axially in the direction of the arrows D into telescopic relation with the keyhole aperture 20 with the flange means 46 oriented within slots 24. The external tapering surfaces on shank 12, shoulder means 28 and flanges 46 assist the telescoping of bushing 10 within keyhole aperture 20 while the strap-like members 40 flex against the substantailly non-compressible shape of rod 19. The axial movement of bushing 10 is continued until the under surface of the head 14 bears against the one side of the support plate 18 and the faces of shoulder means 28 bear against the opposite surface thereof. As can be appreciated, this technique facilitates the mounting of a rod 19 within apertured support plates particularly in those instances where rod 19 includes a bent portion 56 or additional means 58 mounted on and intermediate the extremities of rod 19.

A further embodiment of the present invention is shown in FIG. 7 wherein similar parts bear similar numerals with the addition of a suffix "a". In this embodiment which bears the same basic components namely a shank 12a, a head 14a and rotation-resisting means 16a. The major difference in this embodiment resides in the resilient means circumferentially spaced within the bore, namely, instead of strap-like means 40 this embodiment employs a plurality of axially extending ribs 60 which project inwardly from the wall of through bore 26. The rib like members 60 are resilient and capable of being deformed when the bushing 10a is circumferentially collapsed around a mating rod-like member.

The strap-like members 40 and the resilient ribs 60 are merely examples of two embodiments which will resiliently support a rod-like member between spaced points. In the event that the keyhole apertures 22 in support means 18 are not in registry along a common axis, the strap-like means 40 or the rib 60, depending which embodiment is utilized, are sufficiently resilient to accept an off-center rod means 19. Additionally, in the event that the diameter of rod means 19 has a variation in its tolerances it too will be accepted within the resilient means. The resilient means within the through bore 26 serves to both concentrically support the rod-like member 19 and additionally serves to act as a brake to prevent unwanted rotation of same.

Thus, it is apparent that when the principles of the present invention are utilized a rod-like member 19 can be readily mounted in spaced support means 18 and successfully utilized to carry out various functions which previously required expensive and complex arrangements.

While only two embodiments have been utilized to illustrate the teachings of the present invention, it is felt that other embodiments will be apparent to those skilled in the art and it is my wish that I be restricted only by the appended claims.

I claim:

1. A one-piece plastic bushing member for use with an elongated rod-like member to support the member in a support plate having an aperture therein, said bushing member including a shank, a laterally extending head means adjacent one end of the shank, shoulder means extending outwardly from said shank in spaced position to said head means, a through bore extending through said head and said shank, said through bore being substantially circular in cross-sectional configuration, a plurality of thin strap-like members attached at their opposite ends and circumferentially arranged in chordal positions within said bore and forming a passageway which is non-circular in configuration with said strap-like means being adapted to be radially distorted to resiliently engage said rod-like means for rotation under spring pressure when mounted within said bushing member when said bushing member is mounted in said apertured plate, said shank and laterally extending head means being axially split so that said bushing member is circumferentially expandable and capable of being laterally slipped into said rod-like member and moved into mounted position within said support plate aperture, said support plate and said bushing member having cooperable means to prevent rotation between said support plate and said bushing member.

2. A device of the type claimed in claim 1 wherein the aperture in said support plate includes a slot opening laterally through one edge of said support plate, the means to prevent rotation between said bushing member and said support plate including integral laterally extending means positioned adjacent said split and adapted to engage the slot portion of said aperture and means to prevent lateral movement of said bushing into said slot.

3. Bushing means for a rod-like device in combination with a complementary support plate having an opening through one edge thereof, the wall of said opening adapted to compressably receive said bushing, said opening being defined by at least one straight side, said bushing including a one-piece split plastic externally tapered hollow member adapted to be slipped into the complementary rod-like device, a radially extending head adjacent to but of larger diameter than the large end of the taper, the split being wide enough to allow substantial contraction of the member, a plurality of resilient means extending inwardly from said member and adapted to engage said rod-like means, said resilient means which extend inwardly from said tapered member including a plurality of resilient strap-like members attached at their individual opposite ends to the interior of said tapered member, said rod-like member being cylindrical in configuration and said strap-like members being chordally disposed defining a non-circular cross-sectional configuration to the interior of said member, shoulder means on said tapered portion extending outwardly therefrom in opposition to and spaced from said head flange, the larger end of the taper having a diameter such that, when the tapered end of the member is forced into said plate opening and the plate is positioned between the shoulder means and the head, the wall of said opening in the plate compresses the member and closes the split whereby said strap-like members are deformed to conform to the circular configuration of said rod-like means at limited bearing points intermediate the extremities of said strap-like members, means on said member adapted to cooperate with the straight side of the opening to prevent the member from turning in the plate.

4. A combination of the type claimed in claim 3 wherein the opening in the edge of said plate is defined by a slot opening into and communicating with a circular aperture spaced from the edge of said plate, said slot having a transverse measurement at least equal to the diameter of said rod-like means whereby said rod-like means can be transversely introduced into said opening through said slot with the axis of said rod-like means being perpendicular to the said plate means.

5. A combination of the type claimed in claim 4 wherein said tapered member includes a pair of integral laterally projecting means extending from adjacent said split in said tapered member and adapted to engage the slot in said opening.

6. Two or more one-piece plastic bushing members for use with an elongated substantially rigid cylindrical rod-like member in combination with an equal number of support plates each having an aperture, the wall of said apertures each including a slot communicating with an edge of said plate and opening into an annular configuration spaced from said plate edge, each of said plastic bushing members being axially split and adapted to be radially expanded and slipped on to the rod-like means and to be moved into mounted position within one of said apertures, each of said bushing members including an externally tapered shank, a laterally extending head means adjacent the larger end of the taper, shoulder means extending outwardly from said tapered shank in opposition to said head means, a through bore traversing said head and shank and communicating with said axially extending split, a plurality of circumferentially spaced resilient means extending inwardly into said through bore for deformably engaging said rod-like means, said inwardly directed means includes a plurality of thin, resilient strap-like members each fastened at their opposite ends in chordal arrangement to the inner walls of said member forming the pass through bore and forming an axially extending passage having a non-circular cross-sectional configuration whereby said web-like members contact said rod-like member at circumferentially spaced points all of which are intermediate the extremities of said strap-like means, said strap-like means being deformable radially outwardly at said point of contact to assume a configuration substantially identical with the diametral cross-section of said rod-like means, said head means being relieved diametrically opposite said slot means to provide a hinge point for facilitating circumferential flexing of said member during application to said rod-like means and means extending laterally outwardly from said member for engaging the flat walls of said keyhole opening to prevent rotation of said bushing.

References Cited
UNITED STATES PATENTS

| | | | |
|---|---|---|---|
| 2,458,670 | 1/1949 | Young | 248—56 |
| 2,897,022 | 7/1959 | Marola | 85—8.8 |
| 3,001,007 | 9/1961 | Klumpp et al. | 174—153 |
| 3,143,284 | 8/1964 | Lindsjo et al. | 248—26 X |
| 3,243,206 | 3/1966 | Samer. | |
| 3,275,275 | 9/1966 | Erhart et al. | 248—26 X |

FOREIGN PATENTS

| | | |
|---|---|---|
| 1,373,436 | 8/1964 | France. |
| 1,031,777 | 6/1966 | Great Britain. |

ROY D. FRAZIER, *Primary Examiner.*

R. P. SEITTER, *Assistant Examiner.*